United States Patent Office

3,398,891
Patented Aug. 27, 1968

3,398,891
THERMOSTATIC BY-PASS CONTROL VALVE
Alexander Dewar Horne, Johnstone, Scotland, assignor to The Horne Engineering Company Limited, Johnstone, Scotland, a British company
Filed Sept. 6, 1966, Ser. No. 577,459
Claims priority, application Great Britain, Jan. 25, 1966, 3,400/66
5 Claims. (Cl. 236—18)

ABSTRACT OF THE DISCLOSURE

A thermostatic valve for controlling the flow of heating fluid to a heat exchanger associated with a vessel for liquid so as to maintain the temperature of the heated liquid at a predetermined value has a casing with a main portion for through flow of heating fluid and a branch portion for the diversionary flow of heating fluid. A housing opening laterally from the main casing encloses thermo-sensitive expansion means which includes an elongated thermal expansion device extending into the branch portion. A pair of opposed seatings are provided in the casing associated with the main portion and branch portion respectively and the expansion means carries a closure disc disposed between the seatings, the disc being urged into contact with the branch seating by spring means to close the passage to the branch portion. The casing is adapted to be attached to the vessel so that the housing projects into the vessel and the expansion device is responsive to the temperature of liquid therein. On heating of the liquid within the vessel to the desired temperature and consequent thermal expansion of the device, the device firstly comes into engagement with an abutment in the branch portion, and thereafter the closure disc is forced clear of the branch seating to cause diversionary flow of heating fluid.

---

This invention relates to a thermostatic valve for controlling the flow of heating fluid to a heater for liquid so as to tend to maintain the temperature of the heated liquid at a predetermined value.

The chief object of the invention is to provide for improved thermostatic control of the flow of heating fluid.

According to the present invention a thermostatic valve for controlling the flow of heating fluid to a heater for liquid so as to maintain the temperature of the heated liquid at a predetermined value comprises a casing having a main portion for through flow of heating fluid to the heater and a branch portion for the diversionary flow of heating fluid from the main portion to by-pass the heater, an elongated housing opening laterally from the main portion opposite the branch portion, a pair of opposed seatings in the casing associated respectively with the main portion and the branch portion, thermo-sensitive expansion means extending into the housing and branch portion and including a closure member disposed between the seatings, an abutment in the branch portion engageable with the adjacent end of the expansion means so that the closure member moves clear of the branch seating on thermal expansion of the device, and a compression spring in the outer end of the housing engaging the adjacent end of the expansion means to urge the closure member towards the branch seating, the arrangement being such that with the housing projecting into the heater and the liquid temperature rising beyond a predetermined value the closure member moves from the branch seating to permit diversionary flow of heating fluid.

Preferably the thermo-sensitive expansion device includes an elongated cylinder reciprocable in the housing and having a closed outer end and having the closure member attached to its inner end, an expansion member within the cylinder, a piston actuable by the expansion member, a rod in the piston extending through an opening in the closure member and engageable with the abutment in the branch portion, and spring means in the cylinder urging the expansion member into engagement with the outer end of the cylinder.

Preferably the abutment is adjustable relative to the adjacent end of the expansion device to set the valve for maintenance of any selected temperature of a range of temperatures for the heated liquid.

Preferably also the branch portion includes an end closure, and a tubular part having a lateral discharge, the tubular part being releasably clamped to the main portion by the end closure such that the tubular part may be rotated to permit angular adjustment of the direction of the discharge.

Preferably also the end closure includes a perforated annular member detachably secured to the wall of the main portion of the casing and extending co-axially within the tubular part with its perforated walls spaced from the walls of the tubular part, and the branch seating is presented by the inner end of the perforated annular member, whereby removal of the end closure enables withdrawal of the expansion device through the tubular part for repair or replacement.

An embodiment of the invention will now be described by way of example only, with reference to the accompanying drawings in which.

Figure 2:
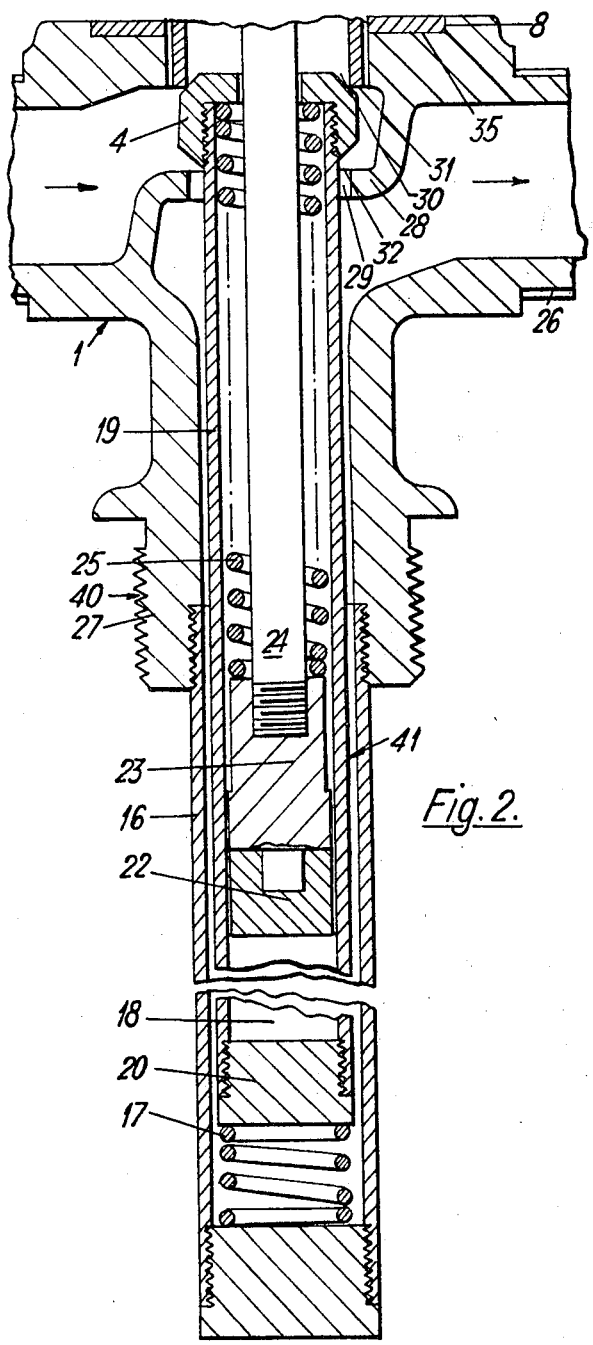
FIG. 2 is a cross-sectional elevation showing in greater detail the expansion device of the valve of FIG. 1 fitted in the casing and housing.

Referring to the drawings, a thermostatic valve especially suitable for controlling the supply of primary hot water to the heating coil of a calorifier (part of the wall 50 thereof being shown) in a district water-heating system (not shown) has a casing composed of a main cylindrical portion 1, having an inlet 45 and an outlet 46, for through flow of primary hot water from a source (not shown) to the heating coil, and a branch cylindrical portion 2 normal to the main portion 1 and through which the primary hot water is diverted from the heating coil to a by-pass. The branch portion has an outlet 47 to the by-pass. The inlet 45 and outlets 46 and 47 are connectible to the supply and by-pass pipes (not shown) by flanged coupling joints 13 13a and 13b respectively including coupling nuts 14 which engage threaded spigots 26 on the casing. A cylindrical housing 40 for an elongated cylindrical thermo-sensitive expansion device 41 projects from the main portion 1 of the casing and is axially aligned with the opposite branch portion 2. The housing 40 is composed of a flange and screw-threaded spigot 27 integral with the main portion 1 and engageable in a tapped opening in the wall 50 of the calorifier, and a cover tube 16 projecting from the spigot 27 and closed at its outer end. An integral web 28 of Z-section in the main portion of the casing has its mid part normal to the axis of the branch portion 2 and has a circular through-opening 29 (see FIG. 2) in the mid part of the same diameter as the inlet 30 (FIG. 2) to the branch portion. The circular edge 31 of the inlet 30 opening to the branch portion 2 and the opposite circular edge 32 of the through-opening 29 constitute a pair of opposed seatings for the valve. The elongated cylindrical thermo-sensitive expansion device 41 extends into and is co-axial with the housing 40 and the branch portion 2 of the casing. The device 41 is composed (see FIG. 2) of an elongated cylinder 19 which is a sliding fit in the housing 40 and reciprocable therein and with a closed outer end 20 a polyethylene expansion rod 18 which is a sliding fit in the cylinder 19 and abuts the closed outer end 20 thereof; a closure member in the form of a disc 4 disposed between the seatings 31, 32 and secured to the inner end of the cylinder 19, the edges of the disc 4 being bevelled and the bevel faces being engageable with the seating edges 32, 31 to seal the openings 29, 30; a pad 22 of bored nylon rod abutting the inner end of the expansion rod 18; a piston 23 abutting the pad 22 which acts to absorb any excessive expansion of the rod 18; a piston rod 24 extending through an opening in the closure disc 4 and projecting into the branch portion 2 of the casing; and a compression spring 25 in the cylinder 19 urging the piston 23 outwards. A compression spring 17 in the outer end of the cover tube 16 urges the cylinder 19 inwards to a position in which the closure disc 4 engages the branch seating 31 to close the branch portion 2.

Figure 1:
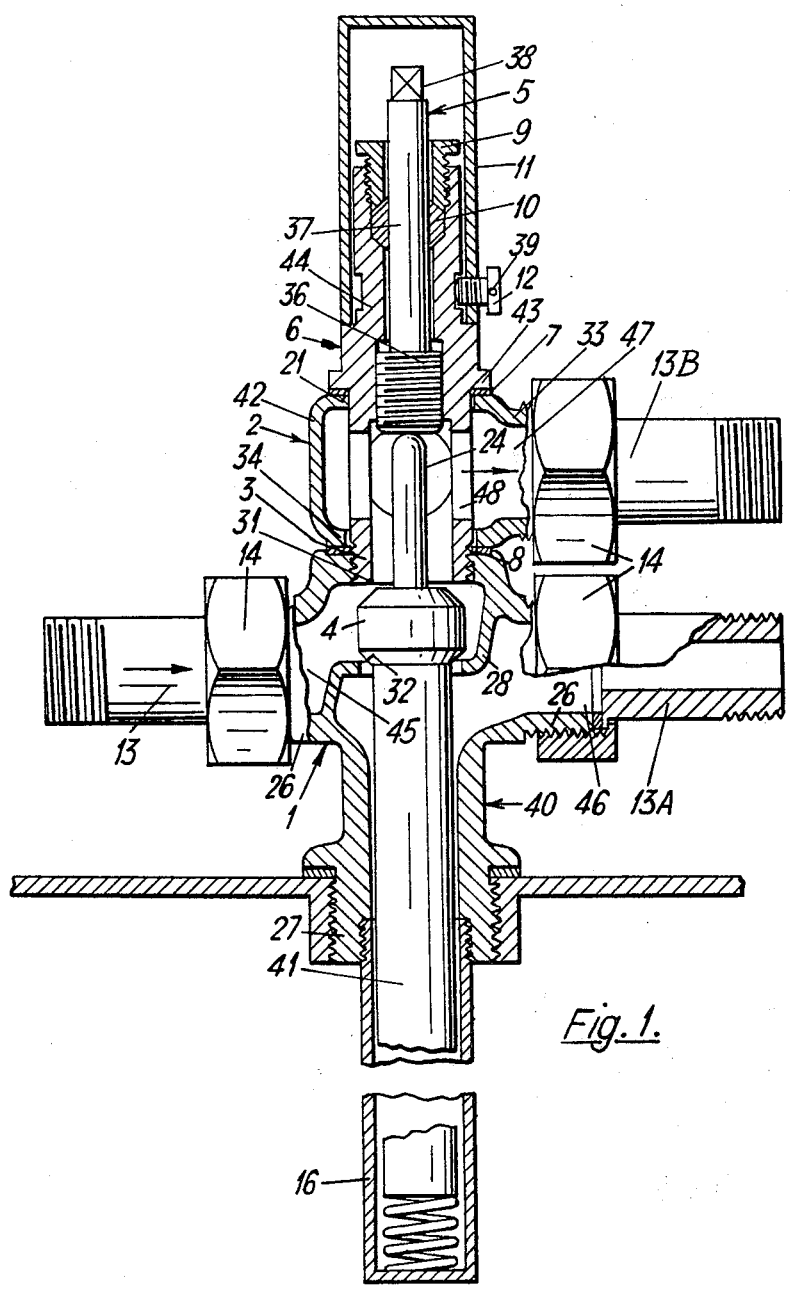
FIG. 1 is a cross-sectional elevation of a thermostatic valve.

The branch portion 2 (see FIG. 1) is composed of a cylindrical tubular part 42, a lateral discharge spigot 33 projecting from the wall of the tubular part, and an elongated cylindrical closure 6 coaxial with the tubular part 42. The inner end of the tubular part 42 has a radial flange 34 which sealingly engages a washer 8 in a corresponding annular seat 35 (see FIG. 2) on the wall of the main portion 1 of the casing. The closure 6 is composed of a cylindrical sleeve 44, an abutment device 5 rotatably mounted in the sleeve for axial adjustment relative to the end of the piston rod 24, and an annular member 3 which projects co-axially from the sleeve 44 and which has its inner end screwed into the main portion 1 of the casing. A flange 43 of the closure 6 sealingly engages a washer 7 seated on a radial flange 21 at the outer end of the tubular part 42. By screwing the closure 6 into the main portion 1 of the casing, the tubular part 42 can be clamped between the portion 1 of the casing and the closure 6. The tubular part 42 can be angularly rotated, when unclamped, to give any radial direction of discharge of the outlet 47.

The abutment device 5 consists of a head 36 in screw-threaded engagement with the inner end of the bore of the sleeve 44 and engageable with the end of the piston rod 24, and a rotary stem 37 on the head 36 and extending through a sealing gland 9 and gland packing 10 at the outer end of the bore of the sleeve 44, said stem 37 having a squared end 38 for manual rotation by means of a key. Rotation of the stem 37 adjusts the head 36 axially in relation to the piston rod 24 and so enables setting of the valve for maintenance of any one of a range of temperatures for the heated liquid. A cap 11 covers the squared end 38 of the stem 37 and is locked in position by a threaded pin 12 penetrating the wall of the cap 1 and entering the sleeve 44. A sealing wire surrounding the cap 11 and penetrating an eye 39 on the locking pin 12 prevents unauthorised alteration of the temperature setting.

The branch seating 31 is formed by the inner edge at the inner end of the annular member 3 having on its walls, apertures 48 spaced from the walls of the tubular part 42 to permit free flow of diverted hot water through the outlet 47 of the tubular part 42 to the by-pass. On removal of the closure 6 by unscrewing same from the main portion 1 of the casing the expansion device is readily gripped by its piston rod 24 and withdrawn through the tubular part 42 for repair or replacement.

In operation of the valve, when the water to be heated in the calorifier is cold, the closure disc 4 is spring-urged against the branch seating 31 to close the branch portion 2 and permit full flow of primary hot water to cool in the calorifier, the spacing of the pre-adjusted abutment head 36 from the end of the piston rod 24 being a measure of the temperature at which the water is to be maintained. The very narrow annular gap between the cylinder 19 on one hand and the casing 1 and cover tube 16 on the other hand will be sealed by some of the primary heating water entering the gap to be residual therein. Thereafter the primary hot water will flow through the valve and be balked from entering the gap by the residual water, and the expansion device will be responsive only to the temperature in the calorifier and not to the primary hot water. The water in the gap, which will have cooled, will transmit heat from the cover tube 16 to the expansion device 41. With the continuous flow of primary hot water, the temperature of the water to be heated gradually rises and the expansion rod 18 expands inwards against spring action to force the end of the piston rod 24 towards the abutment head 36, said end reaching the abtument head 36 when the water temperature is a few degrees below that desired. With any further rise in water temperature, the rod 18 expands inwards against spring action and forces the closure disc 4 clear of the branch seating 31 and towards the through-flow seating 32, the closure disc being designed to reach the through-flow seating 32 when the desired water temperature is attained, so that all the primary flow would be diverted to the by-pass.

However, under working conditions the through-flow to the calorifier is very seldom totally shut off. The closure disc 4 reaches a position between the two seatings 31, 32 such that the major portion of the flow is diverted to the by-pass and the minor portion diverted to the calorifier.

When there is a fall in temperature in the calorifier with consequent contraction of the expansion rod 18, the closure disc 4 moves to shut off the by-pass flow. Thus, the valve tends to maintain the heated water at the temperature for which the valve has been pre-set.

This diverting valve provides for a tight shut-off selectively to either the calorifier or the by-pass depending upon the temperature in the calorifier and the position of the closure disc 4.

With the return of the water to the cold state, the expansion rod 18 contracts and the spring in the cylinder returns the piston rod to its initial position clear of the abutment head 36 ready for the next heating operation.

Advantages of the aforesaid thermostatic valve are:
 (a) The flow of primary hot water does not stop at any time during the heating operation;
 (b) The head loss across the valve is almost a constant.
 (c) The valve is a mechanical self-acting device and does not require for its operation any outside source of power such as electricity or air pressure.
 (d) The only working parts in the valve are the expansion device and spring;
 (e) The expansion device can be withdrawn for repair or renewal without disturbing the pipe connections;
 (f) The branch outlet can be fitted at any radial angle relative to the inlet and outlet of the main portion of the casing to provide a choice of discharge direction;
 (g) The flow of primary hot water can be reversed if required without altering the operation of the thermostat.

I claim:

1. A thermostatic valve for controlling the flow of heating fluid to a heat exchanger associated with a vessel for liquid so as to maintain the temperature of the heated liquid at a predetermined value, comprising a casing having a main portion for through flow of heating fluid to the heater and a branch portion for the diversionary flow of heating fluid from the main portion to by-pass the heater, an elongated housing opening laterally from the main portion opposite the branch portion and insertible in the vessel, a pair of opposed seatings in the casing associated respectively with the main portion and the branch portion, thermo-sensitive expansion means in the housing and having a closed outer end, a closure disc attached to the inner end of the elongated cylinder and disposed between the seatings, an elongated thermal expansion device within the cylinder and extending through an opening in the closure disc and into the branch portion, means for maintaining one end of the expansion device in engagement with the outer end of the cylinder, spring means in the outer end of the housing engaging the adjacent end of the expansion device to urge the closure disc into engagement with the branch seating, and an abutment in the branch portion spaced from the other end of the expansion device a distance corresponding to the temperature desired for the liquid in the vessel so that when said temperature is reached said other end engages the abutment and continued temperature rise causes the disc to move clear of the branch seating to permit diversionary flow of heating fluid.

2. A valve as claimed in claim 1 in which the thermal expansion device includes an expansion member within the cylinder, a piston actuable by the expansion member, a rod in the piston extending through an opening in the closure member and engageable with the abutment in the branch portion, and spring means in the cylinder urging the expansion member into engagement with the outer end of the cylinder.

3. A valve as claimed in claim 1 in which the abutment is adjustable relative to the adjacent end of the expansion device to set the valve for maintenance of any selected temperature of a range of temperatures for the heated liquid.

4. A valve as claimed in claim 1, in which the branch portion includes an end closure, and a tubular part having a lateral discharge, and being releasably clamped to the main portion by the end closure so that the tubular part is rotatable to enable angular adjustment of the direction of the discharge.

5. A valve as claimed in claim 4, in which the end closure includes a perforated annular member detachably secured to the wall of the main portion of the casing and extending co-axially within the tubular part with its perforated walls spaced from the walls of the tubular part, and the branch seating is presented by the inner end of the perforated annular member, whereby removal of the end closure enables withdrawal of the expansion means through the tubular part for repair or replacement.

References Cited

UNITED STATES PATENTS

| | | | |
|---|---|---|---|
| 2,099,643 | 11/1937 | Werring | 236—93 X |
| 2,141,520 | 12/1938 | Dube | 236—12 |
| 2,351,086 | 6/1944 | Wells | 236—12 |
| 3,273,796 | 9/1966 | Bhuerlein | 236—93 |

ROBERT A. O'LEARY, *Primary Examiner.*

W. E. WAYNER, *Assistant Examiner.*

UNITED STATES PATENT OFFICE
CERTIFICATE OF CORRECTION

Patent No. 3,398,891                                             August 27, 1968

Alexander Dewar Horne

It is certified that error appears in the above identified patent and that said Letters Patent are hereby corrected as shown below:

Column 4, line 73, before "having" insert -- including an elongated cylinder --.

Signed and sealed this 10th day of November 1970.

(SEAL)
Attest:

Edward M. Fletcher, Jr.                          WILLIAM E. SCHUYLER, JR.
Attesting Officer                                  Commissioner of Patents